US010552025B2

(12) United States Patent
Brasseur et al.

(10) Patent No.: US 10,552,025 B2
(45) Date of Patent: Feb. 4, 2020

(54) GRAPHICAL USER INTERFACE FOR A HOUSEHOLD APPLIANCE (71) Applicant: Electrolux Appliances Aktiebolag, Stockholm (SE)

(72) Inventors: Jérôme Brasseur, Stockholm (SE); Petter Karlsson, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 169 days.

(21) Appl. No.: 15/510,054

(22) PCT Filed: Sep. 23, 2015

(86) PCT No.: PCT/EP2015/071807
§ 371 (c)(1),
(2) Date: Mar. 9, 2017

(87) PCT Pub. No.: WO2016/062490
PCT Pub. Date: Apr. 28, 2016

(65) Prior Publication Data
US 2017/0300217 A1 Oct. 19, 2017

(30) Foreign Application Priority Data
Oct. 24, 2014 (EP) .................................... 14190188

(51) Int. Cl.
G06F 3/0484 (2013.01)
F24C 7/08 (2006.01)
(Continued)

(52) U.S. Cl.
CPC .......... *G06F 3/04847* (2013.01); *F24C 7/086* (2013.01); *G06F 3/04817* (2013.01); *G06F 3/04886* (2013.01); *G06F 2203/04803* (2013.01)

(58) Field of Classification Search
CPC ....... G06F 3/04847; F24C 7/082; F24C 7/086
See application file for complete search history.

(56) References Cited

U.S. PATENT DOCUMENTS 5,559,301 A     9/1996  Bryan, Jr. et al.
2010/0199854 A1* 8/2010  Homme .................. F24C 7/082
                                                                  99/325
(Continued)

FOREIGN PATENT DOCUMENTS

WO    2014/097553 A1    1/2017

OTHER PUBLICATIONS

Stuart Pook, et al.; "Control menus"; CHI '00 Extended Abstracts on Human Factors in Computing Systems; Originally Dated Jan. 1, 2000; p. 263.
(Continued)

*Primary Examiner* — Roland J Casillas
(74) *Attorney, Agent, or Firm* — Pearne & Gordon LLP (57) ABSTRACT A user interface includes a touch-sensitive display and a display control unit for controlling the touch-sensitive display. A method for controlling a household appliance using the graphical user interface includes the steps of: displaying a first graphical representation on the touch-sensitive display, the first graphical representation including one or more symbols (V1, V2), each symbol (V1, V2) being associated with an appliance subunit of the household appliance; touching a symbol (V1, V2) by a touching means in order to change of a setting value of the appliance subunit associated with the touched symbol (V1) by moving the touching means; determining the moving speed of the touching means by the display control unit; and displaying information at the touch-sensitive display depending on the determined moving speed of the touching means.

24 Claims, 3 Drawing Sheets (51) Int. Cl.
*G06F 3/0481* (2013.01)
*G06F 3/0488* (2013.01)

(56) References Cited

U.S. PATENT DOCUMENTS

2015/0004945 A1* 1/2015 Steeves .................. H04W 4/12
455/412.2
2015/0068408 A1* 3/2015 Nagae .................... H05B 6/062
99/332

OTHER PUBLICATIONS

International Search Report and Written Opinion from Corresponding Application No. PCT/EP2015/071807; dated Dec. 1, 2015.
Flow Menu: Combining Command, Text, and Data Entry. Francois Guimbretiere, Terry Winograd. Proceedings of the 2000 ACM SIGCPR Conference. Chicago, IL. Nov. 1, 2000, pp. 213-216. 4 pages.
Keyboard Shortcuts for iPhone & iPad. Amit Agarwal. https://www.labno.org/software/keyboard-typing-shortcuts-for-iphone-ipad/13564/. Oct. 4, 2013. 10 pages.
EP OA for application No. EP14190188.4, dated Aug. 27, 2019, 11 pages.

\* cited by examiner

GRAPHICAL USER INTERFACE FOR A HOUSEHOLD APPLIANCE

Generally, the present invention relates to the field of graphical user interfaces. More specifically, the present invention relates to a graphical user interface comprising a touch-sensitive display for controlling a household appliance.

BACKGROUND OF THE INVENTION

Graphical user interfaces comprising a touch-sensitive display are known in prior art. Specifically, household appliances, for example, hobs have been presented which show a touch-sensitive display for controlling the operation of the household appliance. A user interaction at the graphical user interface allows is modifying a plurality of settings of the household appliance, for example, the power provided to the appliance or an appliance subunit.

A major disadvantage of known graphical user interfaces is that said touch-sensitive displays suffer from insufficient user friendliness and low intuitive operability.

SUMMARY OF THE INVENTION

It is an objective of the embodiments of the invention to provide a graphical user interface with an improved and user-friendly operability. The objective is solved by the features of the independent claims. Preferred embodiments are given in the dependent claims. If not explicitly indicated otherwise, embodiments of the invention can be freely combined with each other.

According to an aspect, a method for controlling a household appliance using a graphical user interface is disclosed. The user interface comprises a touch-sensitive display and a display control unit for controlling the touch-sensitive display. Said touch-sensitive display may be any kind of touchscreen, for example, resistive, capacitive or inductive touchscreen. The display control unit might be included in the touchscreen or a separate control unit being coupled with the touch-sensitive display is included. The method for controlling the household appliance comprises the steps of:
  displaying a first graphical representation on the touch-sensitive display, the first graphical representation comprising one or more symbols, each symbol associated with an appliance subunit of the household appliance;
  recognizing a touching of a symbol by a touching means and recognizing the movement of the touching means in order to gather information regarding the change of a setting value of the appliance subunit associated with the touched symbol;
  determining the moving speed of the touching means by the display control unit;
  if the moving speed is below a threshold value:
    transmitting control signals from the display control unit to the touch-sensitive display in order to change the first graphical representation into a second graphical representation;
    displaying information regarding a change of a setting value of the appliance subunit associated with the touched symbol when said touching means is dragged from a first position to a second position at the touch-sensitive display; and
    changing the graphical representation at the touch-sensitive display from the second graphical representation to a third graphical representation and taking over the setting value when lifting the touching means from the touch-sensitive display;
  if the moving speed is equal to or above said threshold value:
    transmitting control signals from the display control unit to the touch-sensitive display in order change the graphical representation to a second graphical representation;
    displaying information regarding a change of a setting value of the appliance subunit associated with the touched symbol when said touching means is dragged from a first position to a second position at the touch-sensitive display; and
    taking over the setting value when lifting the touching means from the touch-sensitive display.

Said method is advantageous because a setting associated with an appliance subunit of the household appliance can be changed with a single drag user interaction on the touch-sensitive display in an intuitive and user-friendly way. Multiple touches at different locations of the touch-sensitive display are avoided. In addition, the control procedure automatically adapts to the respective user depending on the control behavior of said user thereby achieving a high degree of user acceptance.

According to embodiments, the changed setting value associated with the second position is forwarded to an appliance control unit when the finger is lifted in order to adapt the setting value of said appliance subunit associated with the touched symbol. The appliance control unit may perform the power control of different appliance subunits, for example, heating elements of the hob. Thus the changed setting value may be a power setting value. The appliance control unit may change the power or any other setting of the appliance subunit based on the setting value received by the display control unit.

According to embodiments, the information regarding a change of a setting value is displayed in proximity to the touched symbol. Thereby, an intuitive and user-friendly control of the household appliance is possible, because the proximity of the symbol indicating the appliance subunit and the setting value directly indicates which setting value correlated with which appliance subunit has been changed.

According to embodiments, the information regarding a change of a setting value is adjusted based on the movement of said touching means such, that the displayed setting value is synchronously or substantially synchronously changed with the movement of said touching means. Thereby, the user-friendliness of the control method is further enhanced.

According to embodiments, the first and third graphical representation comprises a plurality of symbols and the second graphical representation comprises fewer symbols than the first and third graphical representation or only the single symbol which has been touched by the user in order to change the setting value.

According to embodiments, a value range indication is displayed in the second graphical representation in order to indicate which position on the touch-sensitive display is associated with a certain setting value. In addition, the touched symbol may also comprise information regarding the setting value correlated with the actual position of the touching means. Based on the value range indication, the user gets information which position to choose in order to obtain a desired setting value. In addition, the value range indication might indicate the dragging direction of the touching means.

According to embodiments, after lifting the touching means at the second position, the graphical representation on the touch-sensitive display is changed into the third graphical representation which essentially corresponds to the first graphical representation. In other words, after lifting the touching means, the value range indication may be removed. The third graphical representation may display the chosen setting value in correlation with the symbol in order to inform the user which setting value has been chosen for the corresponding appliance subunit.

According to embodiments, the changed setting value is displayed for a limited period of time on the touch-sensitive display in association with the touched symbol after lifting the touching means from the touch-sensitive display at the second position. Thereby, the adapted setting value is still visible even after lifting the touching means in order to provide information regarding the chosen value to the user.

According to a second aspect, a graphical user interface for controlling household appliances is disclosed. The graphical user interface comprises a touch-sensitive display and a display control unit for controlling the touch-sensitive display. The touch-sensitive display is adapted for displaying one or more symbols associated with an appliance entity of the household appliance in a first graphical representation. The graphical user interface adapted for:
  displaying a first graphical representation on the touch-sensitive display, the first graphical representation comprising one or more symbols, each symbol associated with an appliance subunit of the household appliance;
  recognizing a touching of a symbol by a touching means and recognizing the movement of the touching means in order to gather information regarding the change of a setting value of the appliance subunit associated with the touched symbol;
  determining the moving speed of the touching means by a display control unit;
  if the moving speed is below a threshold value:
    transmitting control signals from the display control unit to the touch-sensitive display in order to change the first graphical representation into a second graphical representation;
    displaying information regarding a change of a setting value of the appliance subunit associated with the touched symbol when said touching means is dragged from a first position to a second position at the touch-sensitive display; and
    changing the graphical representation at the touch-sensitive display from the second graphical representation to a third graphical representation and taking over the setting value when lifting the touching means from the touch-sensitive display;
  if the moving speed is equal to or above said threshold value:
    transmitting control signals from the display control unit to the touch-sensitive display in order change the graphical representation to a second graphical representation;
    displaying information regarding a change of a setting value of the appliance subunit associated with the touched symbol when said touching means is dragged from a first position to a second position at the touch-sensitive display; and
    taking over the setting value when lifting the touching means from the touch-sensitive display.

According to an embodiment of the graphical user interface, the display control unit is adapted to forward the changed setting value associated with the second position to an appliance control unit when the touching means is lifted from the touch-sensitive display in order to adapt an operating parameter of said appliance subunit associated with the touched symbol.

According to an embodiment of the graphical user interface, the touched symbol keeps displayed at the first position when dragging the touching means.

According to an embodiment of the graphical user interface, the display control unit is adapted to adjust the information regarding a change of a setting value based on the movement of said touching means such, that the displayed setting value is synchronously or substantially synchronously changed with the movement of said touching means.

According to an embodiment of the graphical user interface, the display control unit is adapted to drive the touch-sensitive display such that the same number of symbols are displayed in the first and third graphical representation and a reduced number of symbols or only the single touched symbol are displayed in the second graphical representation.

According to an embodiment of the graphical user interface, the display control unit is adapted to drive the touch-sensitive display such that a value range is displayed in the second graphical representation in order to indicate which position at the touch-sensitive display is associated with a certain setting value.

According to an embodiment of the graphical user interface, the display control unit is adapted to drive the touch-sensitive display such that after lifting the touching means at the second position, the chosen setting value of the appliance entity associated with the touched symbol is displayed for a limited period of time (e.g. 10 s-60 s) in association with the touched symbol.

According to a third aspect, a household appliance comprising a graphical user interface is disclosed. The graphical user interface is configured according to the embodiments described above.

The terms "essentially", "substantially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

Figure 1:
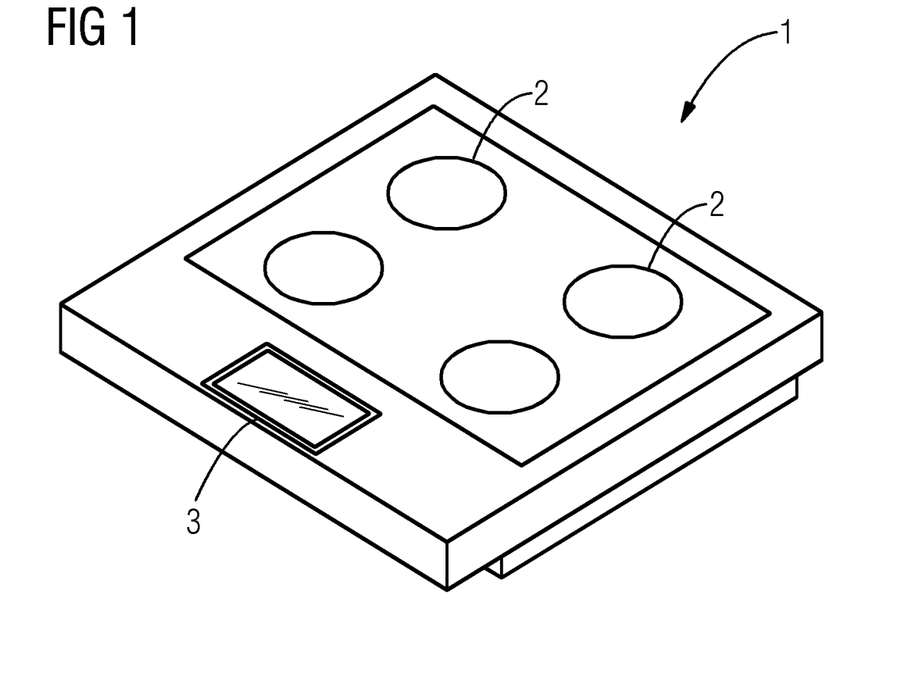
FIG. 1 shows an example schematic view of a hob comprising a graphical user interface.

FIG. 1 shows a schematic diagram of a hob 1 comprising a plurality of heating zones 2. The hob 1 may be, for example, an induction hob. It is worth mentioning, that the invention is not limited to hobs but also refers to other household appliances, for example, dish washers, baking ovens, washing machines, dryers etc. Each heating zone may comprise one or more heating elements, for example, induction coils or heating coils for electrical resistance heating.

In order to control the heating zones 2, the hob 1 comprises a user interface formed by a touch-sensitive display 3. The touch-sensitive display 3 is configured to receive a command to drive heating zones 2 from a user and to display information related to an operation of the hob 1. In general, the touch-sensitive display 3 forms an input and display unit, thereby simultaneously serving as the input unit and the display unit. That is, a user receives a current operation state of the hob 1 through various types of information displayed on the touch-sensitive display 3. In addition, a user makes contact with the touch-sensitive display 3, thereby generating a control command for controlling the hob 1, e.g. increasing or decreasing the heating power of one or more heating elements.

Figure 2:
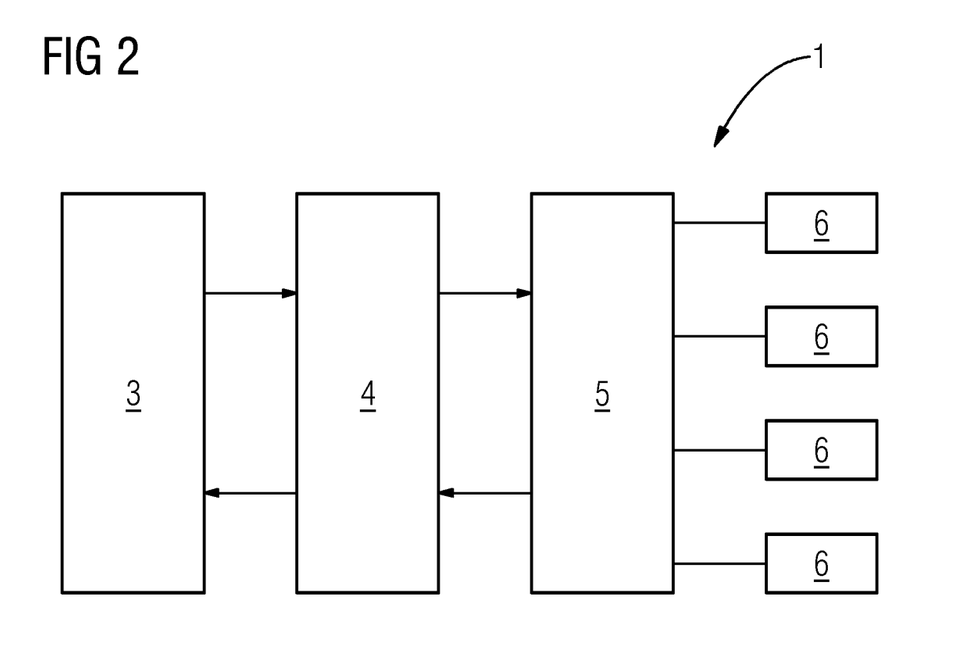
FIG. 2 shows an example block diagram of a hob.

FIG. 2 shows an example schematic structure of the hob 1 by means of a block diagram. The touch-sensitive display 3 is coupled with a display control unit 4 which is adapted to control the touch-sensitive display 3. Specifically, the display control unit 4 determines the location at which a user touches the display 3 and interprets the intended user command based on the symbols displayed on the screen and the location of the touch. Furthermore, the display control unit 4 controls the symbols and illustrations displayed at the touch-sensitive display 3, for example the arrangement of symbols, the size of the symbols and other display settings, for example display brightness. The display control unit 4 may be integrated in the control touch-sensitive display 3 or may be a discrete unit within the hob 1.

The display control unit 4 may be coupled with a hob control unit 5 which is configured for controlling the hob 1. For example, the hob control unit 5 may control the power provided to the heating elements, realize a timer function for driving one or more heating elements for a certain period of time, etc. The hob control unit 5 may be coupled with the heating elements 6 for providing electrical power to said heating elements 6 according to the settings entered at the touch-sensitive display 3. The coupling between the hob control unit 5 and the heating elements 6 may be a direct coupling or an indirect coupling via an electrical power unit or an inverter unit (in case that the heating elements 6 are induction coils).

Figure 3A:
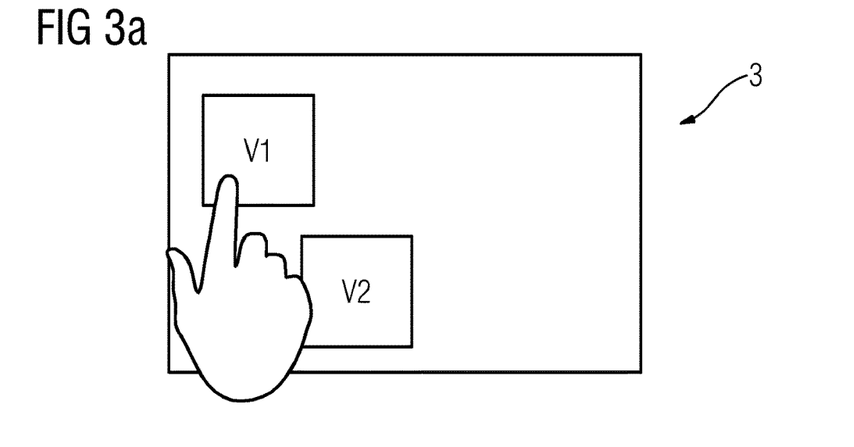
FIGS. 3a-3c shows a first example touch and slide user interaction at the graphical user interface of the hob.
Figure 3B:
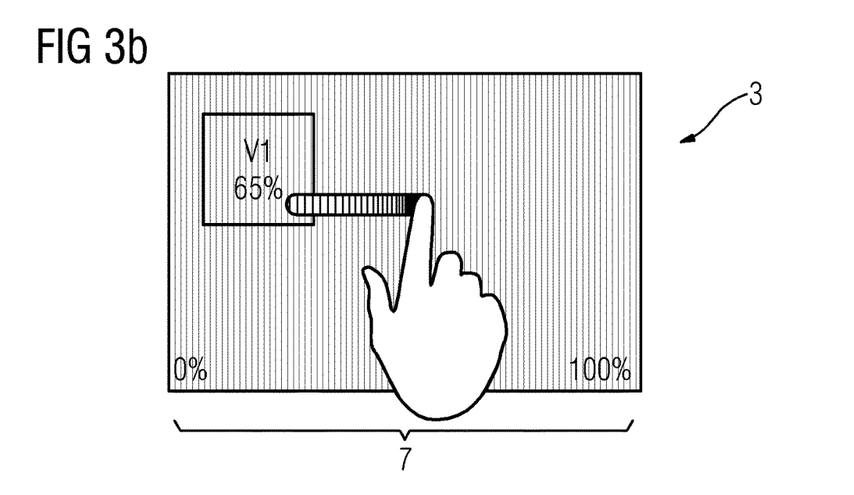
Figure 3C:
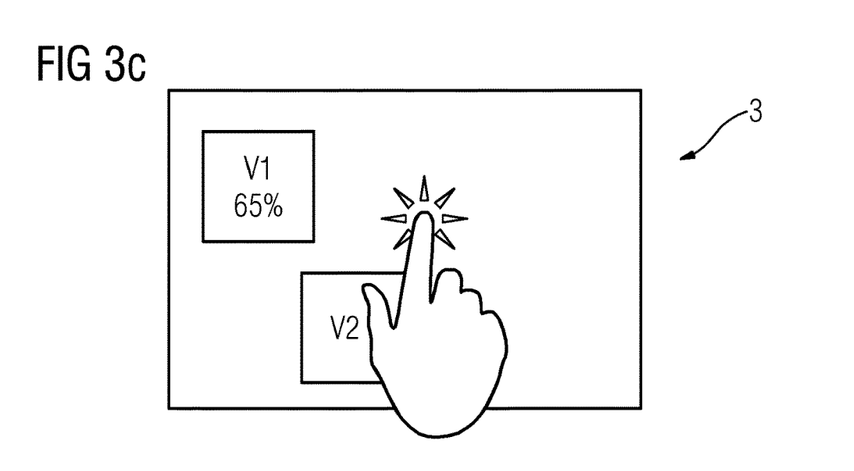

FIGS. 3a-3c show a first example gesture control of the hob 1 by a sequence of illustrations sequentially displayed at the touch-sensitive display 3. The shown example is used for controlling the power of a heating zone 2 of the hob 1. Of course, said gesture control may also be used for other control tasks, for example controlling a timer function etc.

FIG. 3a shows a first graphical representation at the touch-sensitive display 3 at the beginning of a gesture control. The touch-sensitive display 3 shows, for example, two symbols V1 and V2, wherein each symbol may be associated with a respective heating zone 2. The position of the symbols on the touch-sensitive display 3 may be correlated with the position of the respective heating zone 2 at the cocking surface of the hob 1. It is worth mentioning that the position of said symbols V1 and V2 in FIG. 3a is not correlated with any operational properties, for example, the power provided to the respective heating zone correlated with the symbol.

If a user touches the touch-sensitive display 3 (by appropriate touching means, e.g. a finger or elbow) in the area at which the respective symbol V1, V2 is located, the display control unit 4 may receive information regarding the position of the touch. The display control unit 4 also has knowledge which symbol is located at the touched position. For example, the display control unit 4 comprises a memory unit for storing information regarding which symbol is located at which position/area of the touch-sensitive display 3. Thus, the display control unit 4 is able to correlate the touched position with a displayed symbol (in the present example, symbol V1).

In order to control at least a subunit of the hob 1, in general an appliance subunit, one of said symbols is touched by said touching means and said touching means are moved along the touch-sensitive display 3 while keeping the display touched. In order to determine the experience of a user in operating the hob 1 and adapt the gesture control according to said experience, the display control unit 4 is adapted to determine the moving or dragging speed of the touching means. More in detail, the moving speed of the touching means is compared with a moving speed threshold value in order to determine if said moving speed is above the threshold value, below the threshold value or equal to the threshold value.

In case that the moving speed is below the threshold value, a control routine providing an increased amount of information is started because it is assumed that a less accustomed user is operating the hob 1. Therefore, the graphical representation displayed at the touch-sensitive display 3 may change into a second graphical representation displaying (FIG. 3b). Said second graphical representation may display control setting information which may assist a less versant user is controlling the hob 1. For example, information regarding an operational property may be displayed in association with the touched symbol. In the present embodiment, power level information may be displayed. In other embodiments, other setting values, in the following also referred to as operational properties, may be displayed, for example a time span indicating the period of time keeping the heating zone correlated with the symbol powered on etc.

While keeping the symbol touched, the user may change the operational property by dragging the touching means along the touch-sensitive display 3. More in detail, the user may move the touching means from a first position to a second position different to the first one. The display control unit 4 may receive information regarding the movement of the touch position and may process operational property change information in order to display a changed operational property value or setting value at the display 3. The value change may depend on the distance between the first and second position. For example, in case that the touching means is only moved along a short distance, the value change may be small whereas the value change may be higher when the symbol is moved along a greater distance.

As shown in FIG. 3b, the second graphical representation may comprise a value range indication 7. Said value range indication 7 may provide information regarding which position on the touch-sensitive display 3 is associated with a respective operational property value. In addition, the value range indication 7 may be indicative for the direction along which the symbol has to be moved in order to change the operational property value.

Furthermore, when changing the graphical representation for displaying control setting information (change into second graphical representation), the number of symbols displayed at the is touch-sensitive display 3 may be reduced in order to provide display space for dragging the touching means without any symbol collision. For example, the second graphical representation for displaying control setting information may only show the touched symbol, i.e. all other symbols are hidden. According to another example embodiment, in the second graphical representation only those symbols may be hidden which are arranged in an area of the display 3 in which the touching means has to be dragged in order to change the operational property value.

When dragging the touching means along the touch-sensitive display 3, the displayed value of the operational property may be immediately updated. Thereby, the user is able to choose the desired value by moving the touching means along the touch-sensitive display 3. The display control unit 4 may process the dragging position of the touching means and update the displayed operational property value according to the distance along which the touching means has been moved.

After the desired operational property value is reached by upper-mentioned dragging of the touching means, the user may lift the touching means thereby stop touching the touch-sensitive display (FIG. 3*c*). Thereby, the operational property value associated with the lift position may be taken over and transmitted to the hob control unit 5 in order to operate the respective heating zone 2 according to said operational property value. More in detail, the operational property value associated with the lift position may be transmitted to the hob control unit 5 and stored in a memory unit. The hob control unit 5 may adapt the operation of the respective heating zone 2 according to the received value.

After said lifting, the graphical representation at the touch-sensitive display 3 may change to a third graphical representation. Said third graphical representation may be identical or similar to the first graphical representation displayed at the beginning of the gesture control operation. Specifically, the symbols which have been removed in the second graphical representation may be displayed again. In addition, the value range indication 7 may be removed. According to preferred embodiments, the chosen operational property value may be displayed for a certain period of time in association with the touched symbol in order to provide information regarding the chosen value to the user.

Figure 4A:
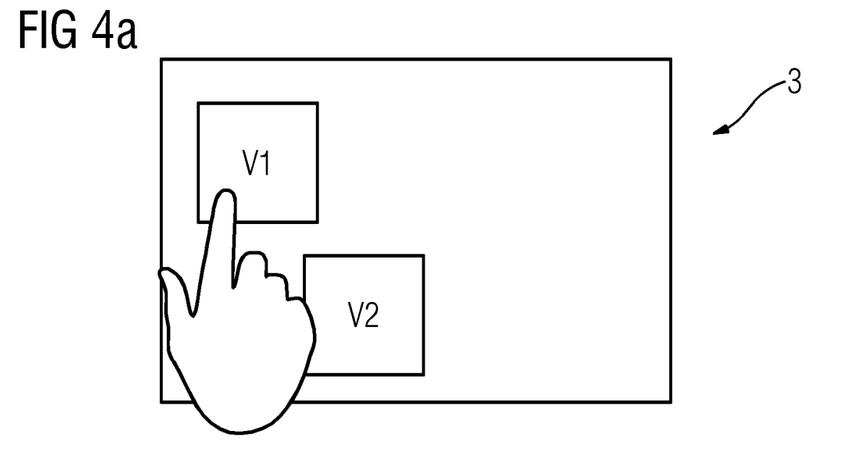
FIGS. 4a-4b shows a second example touch and slide user interaction at the graphical user interface of the hob.
Figure 4B:
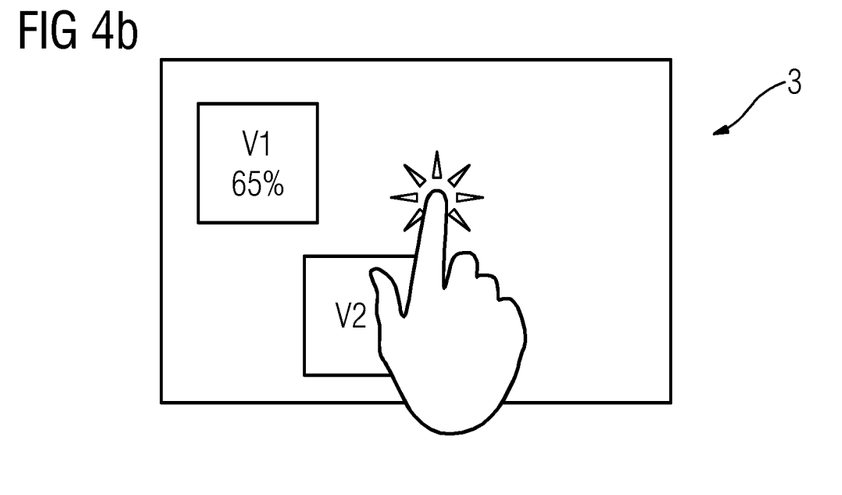

FIG. 4*a* and FIG. 4*b* show the situation when the moving speed of the touching means is equal to or above the threshold value. In that case it is assumed that the user is familiar with the hob 1 and does not need operational help by said second graphical representation. So in other words, the second graphical representation is skipped and the control procedure does only use two graphical representations, namely the first and the third graphical representation according to FIG. 3*a* and FIG. 3*c*.

More in detail, after touching the respective symbol V1, V2 and moving the touching means with a moving speed equal to or above the threshold value, no additional information regarding the value range etc. are displaced but only a changed operational property value or setting value is displayed in correlation with the touched symbol V1, V2. When dragging the touching means along the touch-sensitive display 3, the displayed value of the operational property may be immediately updated in order to inform the user about the current chosen value.

Similar to FIG. 3*c*, in FIG. 4*b*, after the desired operational property value or setting value is reached by upper-mentioned dragging of the touching means, the user may lift the touching is means thereby stop touching the touch-sensitive display (FIG. 4*b*). Thereby, the operational property value associated with the lift position may be taken over and transmitted to the hob control unit 5 in order to operate the respective heating zone 2 according to said operational property value. More in detail, the operational property value associated with the lift position may be transmitted to the hob control unit 5 and stored in a memory unit. The hob control unit 5 may adapt the operation of the respective heating zone 2 according to the received value. In addition, the chosen operational property value may be displayed for a certain period of time in association with the touched symbol in order to provide information regarding the chosen value to the user.

The described gesture control method is advantageous because the household appliance can be controlled in a simple and user-friendly way by a single gesture, i.e. by a single drag operation. In addition, the gesture control automatically adapts to the respective user depending on the control behavior of said user in order to provide a more user-friendly control method.

Above, embodiments of user interface according to the present invention as defined in the appended claims have been described. These should be seen as merely non-limiting examples. As understood by a skilled person, many modifications and alternative embodiments are possible within the scope of the invention.

LIST OF REFERENCE NUMERALS

1 hob
2 heating zone
3 touch-sensitive display
4 display control unit
5 hob control unit
6 heating element
7 value range indication
V1, V2 symbol

The invention claimed is:

1. Method for controlling a household appliance using a graphical user interface, the user interface comprising a touch-sensitive display and a display control unit for controlling the touch-sensitive display, the method comprising the steps of:

displaying a first graphical representation on the touch-sensitive display, the first graphical representation comprising one or more symbols, each symbol associated with an appliance subunit of the household appliance;

touching one of the symbols in the first graphical representation by a touching means in order to select a symbol and change a setting value of the appliance subunit associated with the touched symbol by moving the touching means while keeping the touched symbol touched;

determining the moving speed of the touching means by the display control unit;

if the moving speed is below a threshold value:
transmitting control signals from the display control unit to the touch-sensitive display in order to change the first graphical representation into a second graphical representation;

displaying information regarding the change of the setting value of the appliance subunit associated with the touched symbol, when said touching means is dragged from a first position to a second position at the touch-sensitive display; and changing the graphical representation at the touch-sensitive display from the second graphical representation to a third graphical representation and taking over the setting value when lifting the touching means from the touch-sensitive display;

if the moving speed is equal to or above said threshold value:

transmitting control signals from the display control unit to the touch-sensitive display in order change the first graphical representation to the third graphical representation;

displaying information regarding the change of the setting value of the appliance subunit associated with the touched symbol when said touching means is dragged from a first position to a second position at the touch-sensitive display; and taking over the setting value when lifting the touching means from the touch-sensitive display.

2. Method according to claim 1, wherein the changed setting value associated with the second position is forwarded to an appliance control unit when the touching means is lifted from the touch-sensitive display in order to adapt an operating parameter of said appliance subunit associated with the touched symbol.

3. Method according to claim 1, wherein the information regarding a change of a setting value is displayed in proximity to the touched symbol.

4. Method according to claim 1, wherein the information regarding a change of a setting value is adjusted based on the movement of said touching means such, that the displayed setting value is synchronously or substantially synchronously changed with the movement of said touching means.

5. Method according to claim 1, wherein the first and third graphical representation comprises a plurality of symbols and the second graphical representation comprises fewer symbols than the first and third graphical representation or only the touched symbol.

6. Method according to claim 1, wherein a value range indication is displayed in the second graphical representation in order to indicate which position at the touch-sensitive display is associated with a certain setting value.

7. Method according to claim 1, wherein the changed setting value is displayed for a limited period of time on the touch-sensitive display in association with the touched symbol after lifting the touching means from the touch-sensitive display at the second position.

8. Method according to claim 1, wherein if the moving speed is equal to or above the said threshold value, transmitting control signals from the display control unit to the touch-sensitive display in order change the first graphical representation to the third graphical representation, further comprising transmitting control signals to change the first graphical representation directly to the third graphical representation.

9. Method according to claim 1, wherein the second graphical representation comprises a value range indication regarding the change of the setting value of the appliance subunit of the household appliance, wherein the second graphical representation is not displayed when the moving speed is equal to or above the said threshold value.

10. Graphical user interface for controlling household appliances, the user interface comprising a touch-sensitive display and a display control unit for controlling the touch-sensitive display, the graphical user interface being adapted for:

displaying a first graphical representation on the touch-sensitive display, the first graphical representation comprising one or more symbols, each symbol associated with an appliance subunit of the household appliance;

recognizing a touching of one of the symbols by a touching means in order to select a symbol and recognizing the movement of the touching means, while keeping the touched symbol touched, in order to gather information regarding the change of a setting value of the appliance subunit associated with the touched symbol;

determining the moving speed of the touching means by the display control unit;

if the moving speed is below a threshold value:

transmitting control signals from the display control unit to the touch-sensitive display in order to change the first graphical representation into a second graphical representation;

displaying information regarding a change of a setting value of the appliance subunit associated with the touched symbol when said touching means is dragged from a first position to a second position at the touch-sensitive display; and changing the graphical representation at the touch-sensitive display from the second graphical representation to a third graphical representation when lifting the touching means from the touch-sensitive display;

if the moving speed is equal to or above said threshold value:

transmitting control signals from the display control unit to the touch-sensitive display in order to change the first graphical representation to the third graphical representation;

displaying information regarding a change of a setting value of the appliance subunit associated with the touched symbol, when said touching means is dragged from a first position to a second position at the touch-sensitive display; and taking over the setting value when lifting the touching means from the touch-sensitive display.

11. Graphical user interface according to claim 10, wherein the display control unit is adapted to forward the changed setting value associated with the second position to an appliance control unit when the touching means is lifted from the touch-sensitive display in order to adapt an operating parameter of said appliance subunit associated with the touched symbol.

12. Graphical user interface according to claim 10, wherein the display control unit is adapted to adjust the information regarding a change of a setting value based on the movement of said touching means such, that the displayed setting value is synchronously or substantially synchronously changed with the movement of said touching means.

13. Graphical user interface according to claim 10, wherein the display control unit is adapted to reduce the number of symbols to be displayed in the second graphical representation with respect to the number of symbols displayed in the first graphical representation.

14. Graphical user interface according to claim 10, wherein the display control unit is adapted to drive the touch-sensitive display such that the same number of symbols are displayed in the first and third graphical representation and a reduced number of symbols or only the touched symbol are displayed in the second graphical representation.

15. Graphical user interface according to claim 10, wherein the display control unit is adapted to drive the touch-sensitive display such that a value range indication is displayed in the second graphical representation in order to indicate which position at the touch-sensitive display is associated with a certain setting value.

16. Graphical user interface according to claim 10, wherein the display control unit is adapted to drive the touch-sensitive display such that after lifting the touching means at the second position, the chosen setting value is displayed for a limited period of time on the touch-sensitive display in association with the touched symbol.

17. Household appliance comprising a graphical user interface according to claim 10.

18. Method according to claim 10, wherein if the moving speed is equal to or above the said threshold value, transmitting control signals in order change the graphical representation to the third graphical representation, further comprising transmitting control signals to change the first graphical representation directly to the third graphical representation.

19. Method according to claim 10, wherein the second graphical representation comprises a value range indication regarding the change of the setting value of the appliance subunit of the household appliance, wherein the second graphical representation is not displayed when the moving speed is equal to or above the said threshold value.

20. An appliance comprising a heating zone, a touch-sensitive display, a display control unit to control the touch-sensitive display, an appliance control unit to control heating elements, wherein the touch-sensitive display is configured to:
display a first graphical representation comprising one or more symbols, each symbol associated with the heating elements;
wherein the display control unit is configured to:
recognize a touching of one of the symbols by a touching means in order to select a symbol and recognize the movement of the touching means, while keeping the touched symbol touched, in order to gather information regarding the change of a selected value of the setting value of the heating elements associated with the touched symbol;
determine the moving speed of the touching means;
in response to determining that the moving speed of the touching means is below a threshold value:
transmit control signals to the touch-sensitive display in order to change the first graphical representation into a second graphical representation in response to dragging of the touching means from a first position to a second position at the touch-sensitive display;
drive the touch-sensitive display such that a value range indication is displayed in the second graphical representation in order to indicate which position at the touch-sensitive display is associated with a certain value of the setting value;
in response to lifting the touching means from the touch-sensitive display take over the selected value of the setting value and transmit control signals to the touch-sensitive display in order to change the second graphical representation into a third graphical representation;
in response to determining that the moving speed is above the threshold value:
transmit control signals from the display control unit to the touch-sensitive display in order change the first graphical representation to the third graphical representation; and
take over the selected value of the setting value in response to lifting the touching means from the touch-sensitive display;
wherein the touch-sensitive display is further configured to:
in response to receiving control signals from the display control unit to change the first graphical representation into the second graphical representation, display information regarding a change of the value of the setting value of the heating elements associated with the touched symbol, and display a value range indication in order to indicate which position at the touch-sensitive display is associated with a certain value of the setting value;
in response to receiving control signals from the display control unit to change the first graphical representation into the second graphical representation or into the third graphical representation, display information regarding a change of the value of the setting value of the heating elements associated with the touched symbol;
in response to receiving the control signals to change the second graphical representation into the third graphical representation, change the graphical representation from the second graphical representation to the third graphical representation, wherein the first and the third graphical representation comprise a plurality of symbols and the second graphical representation comprises fewer symbols than the first and the third graphical representation;
wherein the display control unit is further configured to:
in response to lifting of the touching means from the touch-sensitive display, forward to the appliance control unit the changed value of the setting value associated with the second position in order to adapt an operating parameter of the heating elements associated with the touched symbol; and
wherein the appliance control unit is configured to change a setting of the heating elements, in response to receiving the changed value of the setting value associated with the second position from the display control unit.

21. The method according to claim 1 further comprising, recognizing a touching of a symbol by a touching means and recognizing the movement of the touching means in order to gather information regarding the change of a setting value of the appliance subunit associated with the touched symbol.

22. The method according to claim 1, wherein the number of symbols in the third graphical representation is equal to the number of symbols in the first graphical representation.

23. The graphical user interface according to claim 10, wherein the number of symbols in the third graphical representation is equal to the number of symbols in the first graphical representation.

24. The appliance according to claim 20, wherein the number of symbols in the third graphical representation is equal to the number of symbols in the first graphical representation.

* * * * *